Figure 1:
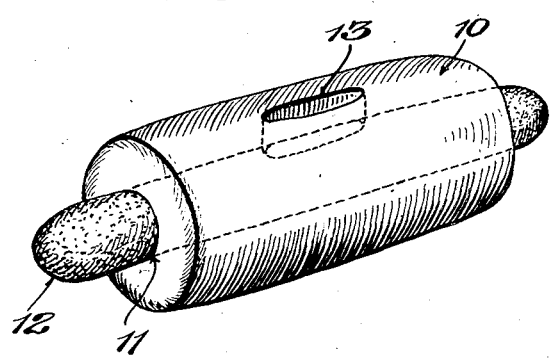

June 23, 1925.

G. W. LYONS

FOOD ARTICLE

Filed May 15, 1923

1,543,650

Inventor
George W. Lyons
By George F. Hall
Attorney

Patented June 23, 1925.

1,543,650

UNITED STATES PATENT OFFICE.

GEORGE W. LYONS, OF NEW HAVEN, CONNECTICUT, ASSIGNOR, BY DIRECT AND MESNE ASSIGNMENTS, TO THE LYONS FLYNN COMPANY, OF NEW HAVEN, CONNECTICUT, A CORPORATION OF CONNECTICUT.

FOOD ARTICLE.

Application filed May 15, 1923. Serial No. 639,166.

*To all whom it may concern:*

Be it known that I, GEORGE W. LYONS, a citizen of the United States, residing at New Haven, in the county of New Haven and State of Connecticut, have invented certain new and useful Improvements in Food Articles, of which the following is a specification, reference being had therein to the accompanying drawings.

This invention relates to a food article, and it is the object thereof, among other things, to provide a roll, bun, biscuit or the like, that will receive a filling without cutting or slicing it as at present.

Referring to the drawings;

The figure is a perspective view of one manner of carrying the invention into practice.

In the drawings, 10 designates a roll, bun, biscuit or the like which is made in any desired form and provided with an opening or hole 11 entirely therethrough.

As illustrated in the drawings, the filling is a frankfort or sausage 12, which is shown as projecting beyond the opposite ends thereof. This filling may be coated with a condiment if desired, and easily inserted in the roll for quick and rapid service and convenience of handling by the consumer.

Under the present practice, the roll is first sliced and the filling then placed between the two pieces. As thus made either the filling or the condiment or both may and does at times fall out of the side of the roll. The exposed filling also soils the fingers even if retained in place.

With my improved food article the filling is held against accidental disengagement and the objectionable features above referred to are not present.

A supplemental opening 13 is formed in a side of the roll or the like between the ends thereof and extends into the main opening 11. The supplemental opening is formed of a size to receive a condiment, the frankfurter or other filler affording a bottom for the supplemental opening to support the condiment. When so constructed the consumer applies a slight pressure to the roll adjacent to the mouth of this latter opening and thereby closes the same tightly against any leakage therethrough.

These rolls can be easily and quickly supplied with any character of filling, may be kept hot without risk of the filling falling out of the roll and may be served and consumed without soiling the fingers.

What I claim as new and desire to secure by Letters Patent is;

A food article including a baked body of dough having a main opening extending through a wall of the body and having a supplemental opening located between the ends of the body and extending into the main opening, said main opening being formed to receive a filling and the supplemental opening being formed to receive a condiment, the part of the filling in register with the supplemental opening affording a bottom for the latter to support the condiment.

In testimony whereof, I have hereunto affixed my signature.

GEORGE W. LYONS.